United States Patent
Carroll

(10) Patent No.: US 7,317,371 B1
(45) Date of Patent: Jan. 8, 2008

(54) LINEAR VARIABLE DIFFERENTIAL TRANSFORMER WITH COMPLIMENTARY STEP-WINDING SECONDARY COILS

(75) Inventor: Anthony Justin Carroll, Sheridan, WY (US)

(73) Assignee: Pearl Process Systems, LLC, Sheridan, WY (US)

( * ) Notice: Subject to any disclaimer, the term of this patent is extended or adjusted under 35 U.S.C. 154(b) by 0 days.

(21) Appl. No.: 11/677,575

(22) Filed: Feb. 21, 2007

(51) Int. Cl.
*H02F 21/06* (2006.01)

(52) U.S. Cl. ..................................... 336/130

(58) Field of Classification Search ........ 336/130–136, 336/220–225; 29/602.1; 324/207.11–207.19; 323/347
See application file for complete search history.

(56) References Cited

U.S. PATENT DOCUMENTS

| | | | |
|---|---|---|---|
| 3,017,589 A | 1/1962 | Chass | |
| 3,235,790 A | 2/1966 | Collins | |
| 3,281,809 A | 10/1966 | Andersson | |
| 3,545,548 A * | 12/1970 | Hadfield | 172/19 |
| 4,052,900 A | 10/1977 | Ganderton | |
| 4,134,065 A | 1/1979 | Bauer et al. | |
| 4,678,991 A | 7/1987 | Schmidt | |
| 4,680,566 A * | 7/1987 | Goseberg et al. | 336/181 |
| 4,694,246 A * | 9/1987 | Avisse | 324/207.18 |
| 4,806,831 A * | 2/1989 | Goseberg et al. | 315/399 |
| 4,808,958 A | 2/1989 | Hewitt et al. | |
| 5,061,896 A * | 10/1991 | Schmidt | 324/207.18 |
| 5,089,930 A * | 2/1992 | Chass | 361/140 |
| 6,242,823 B1 | 6/2001 | Griswold | |
| 6,346,870 B1 * | 2/2002 | Bill et al. | 336/198 |
| 6,605,940 B1 * | 8/2003 | Tabrizi et al. | 324/207.18 |
| 6,617,712 B1 | 9/2003 | Dondi | |
| 7,071,807 B1 | 7/2006 | Herbert | |

* cited by examiner

*Primary Examiner*—Tuyen T. Nguyen
(74) *Attorney, Agent, or Firm*—Antoinette M. Tease

(57) ABSTRACT

A linear variable differential transformer comprising a coil form; a first primary coil; an optional second primary coil; a first secondary coil; and a second secondary coil; wherein the windings of the secondary coils create complimentary and preferably uniform steps. Each step is preferably wound in at least two layers. In the embodiment comprising two primary coils, the inductive couplings between the primary and secondary coils cause null position to be physically centered within the transformer.

32 Claims, 6 Drawing Sheets

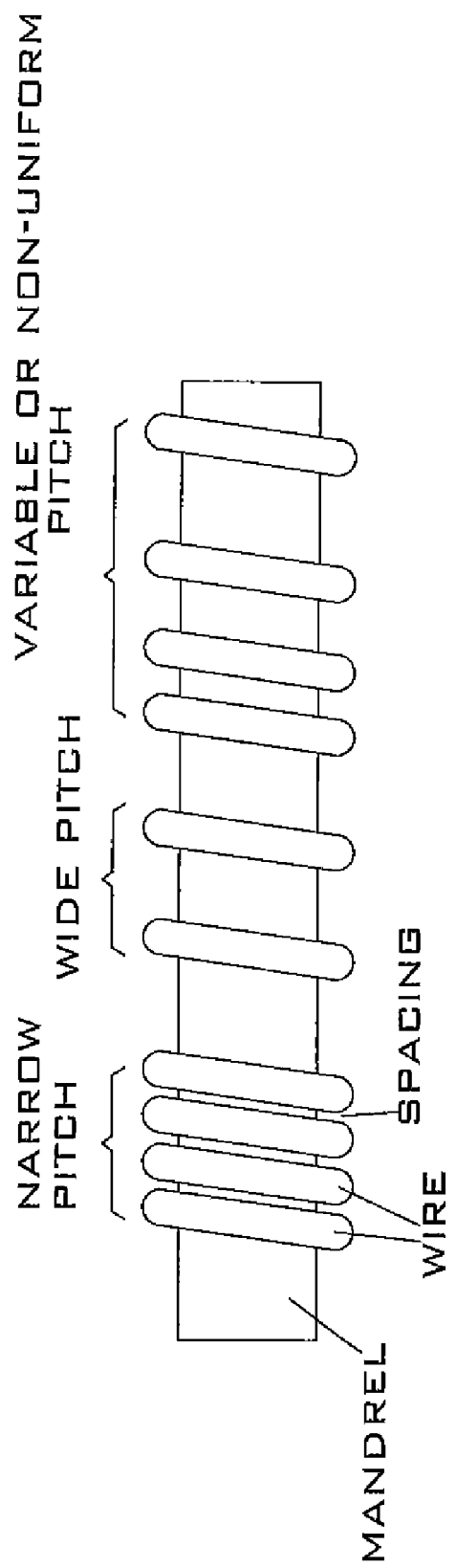

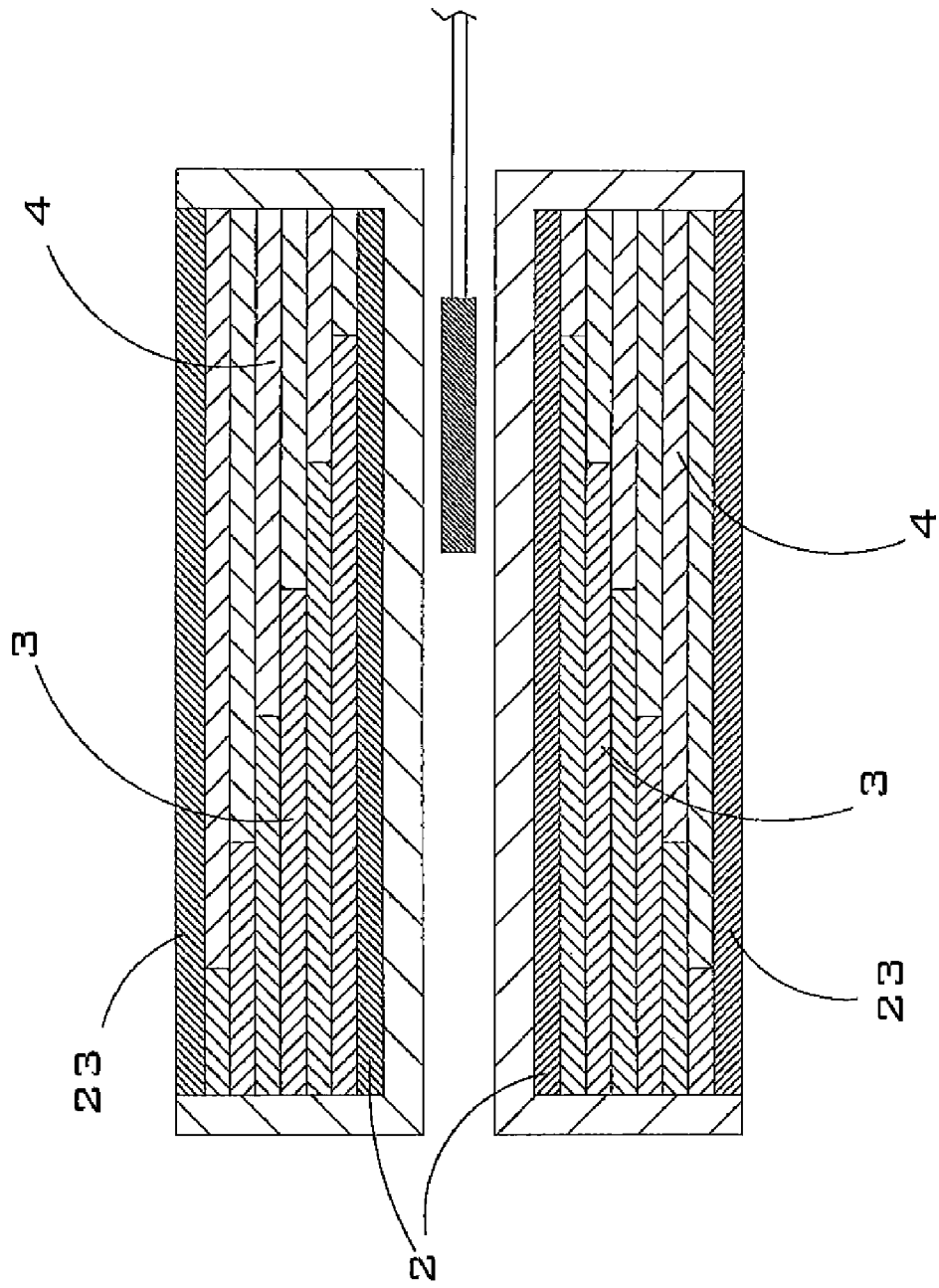

LINEAR VARIABLE DIFFERENTIAL TRANSFORMER WITH COMPLIMENTARY STEP-WINDING SECONDARY COILS

BACKGROUND OF THE INVENTION

1. Field of the Invention

The present invention relates generally to the field of electromechanical devices, and more particularly, to a linear variable differential transformer with complimentary step-winding secondary coils.

2. Description of the Related Art

Linear variable differential transformers (LVDTs) are electromechanical transducers that convert rectilinear motions of externally coupled objects into electrical signals that are proportional to the positions of the objects. LVDTs have been utilized in conjunction with a wide range of measurement and control devices such as flowmeters, strain gages, and pressure sensors. Important characteristics of a practical LVDT include (i) the ability to produce a linear output signal over a relatively large displacement range relative to the overall length of the device, (ii) durability and reliability, and (iii) relatively low cost of manufacture.

Numerous techniques have been employed in the prior art to maximize the linear operating range of LVDTs. Prior art devices are relatively difficult to construct and are therefore relatively expensive to manufacture. The current invention provides a highly linear output signal over a long range of rectilinear displacement, while being simpler and less expensive to construct than currently available LVDT devices.

U.S. Pat. No. 3,054,976 (Lipshutz, 1962) is one such example of a prior art device. In Lipshutz's first embodiment, two separate and overlapping secondary coil windings are utilized. The windings are tapered, with a maximum number of wire layers applied at one end of coil, and the number of layers gradually decreasing to zero at the other end of the coil. The coils are connected with opposing polarities, so that the induced voltages are opposite in phase, causing the net output from the device to be the difference between the induced voltages in the two secondary windings. When a ferrous core is moved longitudinally within the coil array, the induced voltage in one coil increases while the induced voltage in the other coil decreases, thereby producing a variable output voltage that is linearly proportional to the core's position. There are two practical disadvantages to constructing this embodiment of LVDT. The first disadvantage (noted in Lipshutz's patent) is that the core is located physically closer to one of the secondary windings than the other. This arrangement causes the "null point" (i.e., the zero output voltage point) of the core to be physically off-center from the center point of the two secondary coils, which in turn potentially adversely affects the linear range (or maximum measurement range) of the device for some applications. The second—and more important—disadvantage of this embodiment is the difficulty of manufacturing tapered windings by machine or manually. It is impractical to produce coils having sufficient taper with the wire diameters required for LVDTs in practical sizes. Currently available commercial LVDTs do not utilize tapered windings, due to the difficulty of manufacturing such devices.

Lipshutz's second embodiment describes an alternate and more symmetrical tapered winding configuration for the secondary coils that overcomes the null point problem but does not address the difficulty of practical manufacture of the tapered windings.

Lipshutz's third embodiment replaces the tapered windings with a series of discrete multiple coils that are wound between raised ribs or fins on the coil form. Currently available commercial LVDTs use a modified form of this embodiment, in which the coils are pre-wound on individual bobbins, which are then slipped over the coil form and electrically connected. A typical LVDT similar to the one depicted by Lipshutz utilizes 7 primary and 8 secondary coils, which require approximately 34 internal electrical connections. These connections require additional manufacturing steps and are a potential source of reduced reliability for the device.

Lipshutz also describes an embodiment "in which the number of turns in the windings of a differential transformer involving tapered windings may be calculated and wound quickly and efficiently." This embodiment was not intended to be used as an actual LVDT but rather as a prototyping tool for determining the correct winding arrangement for building tapered-coil LVDTs. This embodiment comprises multiple secondary coils (16 of each in the patent illustration), in which the first and second secondary coils are wrapped with one on top of the other. Construction of this device requires winding a portion of the first secondary coils, then winding a portion of the second secondary coils, then again winding a portion of the first secondary coils, until all of the multiple coils are completed. There are no edge supports (i.e., ribs) to keep the individual coils separated and properly stacked in this device, and Lipshutz does not describe the methods used to prevent the relatively short, thick coils from collapsing during the winding process without edge supports.

U.S. Pat. No. 5,327,789 (Nijdam, 1994) is another example of an attempt to address the deficiencies in traditional LVDTs. This patent describes a combined flowmeter-LVDT device that comprises magnetic cores, magnetic coils, and electronics to produce an electrical signal that is proportional to displacement of a magnet within the coil form. This device utilizes relatively simple coils in combination with relatively complex electronic circuitry to produce the desired proportional output. This invention is limited in that the output from the coils are nonlinear; in other words, the output voltage does not vary linearly with the displacement of the core. The non-linear output signal is converted to an equivalent flow rate by use of a "look-up table" that is stored in the electronic circuitry.

U.S. Pat. No. 5,061,896 (Schmidt, 1991) describes a variable transformer with a moveable core and multiple coils that has an output proportional to displacement of the core. In this device, the output voltage remains constant, while the phase angle of the output signal varies proportionally to the displacement of the core. This device utilizes variable-pitch coils and requires relatively complex electronic circuitry, all of which adds to the manufacturing cost.

U.S. Pat. No. 4,134,065 (Bauer et al., 1979) describes an LVDT embodiment that comprises two primary coils and one secondary coil. In this device, displacement of the moveable core is proportional to the phase (not amplitude) of the secondary coil output voltage. In other words, the peak amplitude of the secondary coil remains constant as the inner core moves, while the phase of the output signal changes. As an example, assume that the output voltage is an alternating current sine wave. As the core moves within the LVDT, the peak voltage (i.e., the maximum voltage at the top of each sine peak) of the output does not vary; however, the sine wave shifts left or right (as a function of time) as the core moves. This effect is known as "phase shift" or "variable phase." The magnitude of a sine wave is not linearly proportional to phase shift. Because a linear phase shift of a sine wave results in a non-linear change in output signal, the output of the Bauer device is "linearized" by use of non-uniform layers of coil wraps in primary coils. The thickness of the primary coils is greatest at each end of the mandrel and decreases to minimum thickness at each end of the mandrel. In order to vary the thickness of the primary coil wrappings, Bauer varies the number of layers in the coil wrapping, and he uses discrete "steps" of variation, as opposed to a gradual taper.

In contrast to the present invention, Bauer uses stepped wraps on the primary coils, whereas the present invention comprises stepped wraps on the secondary coils. Bauer uses a constant-thickness secondary coil layer, whereas the present invention utilizes a constant-thickness primary coil layer. Bauer uses two primary coils and one secondary coil, whereas the present invention comprises one primary and two secondary coils. Furthermore, the step size in the Bauer device is not constant; it varies so as to form a non-linear change in coil thickness over the length of the mandrel. This variation in step length is required in the Bauer invention to produce the desired linear relationship between core displacement and output signal. Perhaps most significantly, the present invention is much simpler to construct than the Bauer device. The tall stack comprised of multiple short layers in the Bauer device would be difficult to construct without having the layers collapse during manufacture.

Accordingly, it is an object of the present invention to provide an improved LVDT in which voltage magnitude is used to track core displacement, the output voltage is linearly proportional to core displacement, and the linear operating range of the LVDT is maximized in relation to the overall length of the device. It is a further another object of the present invention to provide an LVDT that is highly reliable, simpler to construct and less expensive to manufacture than prior art devices.

BRIEF SUMMARY OF THE INVENTION

In a preferred embodiment, the present invention is a linear variable differential transformer comprising: a coil form; a single primary coil; a first secondary coil; and a second secondary coil; wherein the primary coil is comprised of a single piece of wire; wherein the primary coil is wound around the coil form in at least two layers; wherein the winding of the primary coil around the coil form begins at a first end of the coil form, proceeds to a second end of the coil form, and then changes direction and continues from the second end of the coil form back to the first end of the coil form, thereby forming the first two layers of the primary coil; wherein the first secondary coil is comprised of a single piece of wire; wherein the first secondary coil is wrapped around the primary coil in multiple stepped layers; wherein each stepped layer of the first secondary coil comprises at least two layers of wire; wherein the winding of the first secondary coil around the primary coil begins at a first end of the primary coil, proceeds to a certain distance short of a second end of the primary coil, and then changes direction and continues back to the first end of the primary coil, thereby forming a first stepped layer in the first secondary coil; wherein the winding of the first secondary coil continues to form a second stepped layer by proceeding from the first end of the primary coil to a certain distance short of the point at which the first stepped layer of the first secondary coil changed direction, changing direction and continuing back to the first end of the primary coil, thereby forming the second stepped layer in the first secondary coil; wherein each subsequent stepped layer of the first secondary coil is wound by beginning at the first end of the primary coil, winding toward the second end of the primary coil, changing direction a certain distance short of the point at which the previous stepped layer changed direction, and continuing back to the first end of the primary coil; wherein the first secondary coil comprises a first stepped layer and a last stepped layer; wherein the distance between the second end of the primary coil and the first stepped layer of the first secondary coil is shorter than the distance between the second end of the primary coil and any other stepped layer of the first secondary coil; wherein the distance between the second end of the primary coil and the last stepped layer of the first secondary coil is longer than the distance between the second end of the primary coil and any other stepped layer of the first secondary coil; wherein the second secondary coil is comprised of a single piece of wire; wherein the second secondary coil is wrapped around the primary coil in multiple stepped layers; wherein each stepped layer of the second secondary coil comprises at least two layers of wire; wherein the winding of the second secondary coil around the primary coil begins at the second end of the primary coil, proceeds to the end of the first stepped layer of the first secondary coil where the winding of the first secondary coil changed direction, changes direction and continues back to the second end of the primary coil, thereby forming a first stepped layer in the second secondary coil; wherein the winding of the second secondary coil continues to form a second stepped layer by proceeding from the second end of the primary coil to the end of the second stepped layer of the first secondary coil where the winding of the first secondary coil changed direction, changes direction and continues back to the second end of the primary coil, thereby forming the second stepped layer in the first secondary coil; wherein each stepped layer of the first secondary coil corresponds to a stepped layer of the second secondary coil; wherein each subsequent stepped layer of the second secondary coil is wound by beginning at the second end of the primary coil, winding toward the point at which the winding of the corresponding stepped layer of the first secondary coil changed direction, changing direction and continuing back to the second end of the primary coil; wherein the second secondary coil comprises a first stepped layer and a last stepped layer; wherein the distance between steps in the second secondary coil is equal to the distance between steps in the first secondary coil; and wherein the length of each corresponding stepped layer in the first secondary coil and the second secondary coil is equal to the distance from the first end of the primary coil to the second end of the primary coil.

In an alternate embodiment, the present invention is a linear variable differential transformer comprising: a coil form; a single primary coil; a first secondary coil; and a second secondary coil; wherein the primary coil is comprised of a single piece of wire; wherein the primary coil is wound around the coil form in at least two layers; wherein the winding of the primary coil around the coil form begins at a first end of the coil form, proceeds to a second end of the coil form, and then changes direction and continues from the second end of the coil form back to the first end of the coil form, thereby forming the first two layers of the primary coil; wherein the first secondary coil is comprised of a single piece of wire; wherein the first secondary coil is wrapped around the primary coil in multiple stepped layers; wherein each stepped layer of the first secondary coil comprises at least two layers of wire; wherein the winding of the first secondary coil around the primary coil begins at a first end of the primary coil, proceeds to a certain distance short of a second end of the primary coil, and then changes direction and continues back to the first end of the primary coil, thereby forming a first stepped layer in the first secondary coil; wherein the winding of the first secondary coil continues to form a second stepped layer by proceeding from the first end of the primary coil to a certain distance short of the point at which the first stepped layer of the first secondary coil changed direction, changing direction and continuing back to the first end of the primary coil, thereby forming the second stepped layer in the first secondary coil; wherein each subsequent stepped layer of the first secondary coil is wound by beginning at the first end of the primary coil, winding toward the second end of the primary coil, changing direction a certain distance short of the point at which the previous stepped layer changed direction, and continuing back to the first end of the primary coil; wherein the first secondary coil comprises a first stepped layer and a last stepped layer; wherein the distance between the second end of the primary coil and the first stepped layer of the first secondary coil is shorter than the distance between the second end of the primary coil and any other stepped layer of the first secondary coil; wherein the distance between the second end of the primary coil and the last stepped layer of the first secondary coil is longer than the distance between the second end of the primary coil and any other stepped layer of the first secondary coil; wherein the distance between the second end of the primary coil and the point at which the winding of the first stepped layer of the first secondary coil changes direction is equal to the distance between the point at which the winding of each subsequent stepped layer of the first secondary coil changes direction and the point at which the winding of the previous stepped layer of the first secondary coil changes direction, thereby creating uniform steps in the first secondary coil; wherein the second secondary coil is comprised of a single piece of wire; wherein the second secondary coil is wrapped around the primary coil in multiple stepped layers; wherein each stepped layer of the second secondary coil comprises at least two layers of wire; wherein the winding of the second secondary coil around the primary coil begins at the second end of the primary coil, proceeds to the end of the first stepped layer of the first secondary coil where the winding of the first secondary coil changed direction, changes direction and continues back to the second end of the primary coil, thereby forming a first stepped layer in the second secondary coil; wherein the winding of the second secondary coil continues to form a second stepped layer by proceeding from the second end of the primary coil to the end of the second stepped layer of the first secondary coil where the winding of the first secondary coil changed direction, changes direction and continues back to the second end of the primary coil, thereby forming the second stepped layer in the first secondary coil; wherein each stepped layer of the first secondary coil corresponds to a stepped layer of the second secondary coil; wherein each subsequent stepped layer of the second secondary coil is wound by beginning at the second end of the primary coil, winding toward the point at which the winding of the corresponding stepped layer of the first secondary coil changed direction, changing direction and continuing back to the second end of the primary coil; wherein the second secondary coil comprises a first stepped layer and a last stepped layer; wherein the distance between the second end of the primary coil and the point at which the winding of the first stepped layer of the second secondary coil changes direction is equal to the distance between the point at which the winding of each subsequent stepped layer of the second secondary coil changes direction and the point at which the winding of the previous stepped layer of the second secondary coil changes direction, thereby creating uniform steps in the second secondary coil; wherein the distance between steps in the second secondary coil is equal to the distance between steps in the first secondary coil; and wherein the length of each corresponding stepped layer in the first secondary coil and the second secondary coil is equal to the distance from the first end of the primary coil to the second end of the primary coil.

In yet another embodiment, the present invention is a linear variable differential transformer comprising a coil form; a first primary coil; a second primary coil; a first secondary coil; and a second secondary coil; wherein the first primary coil is comprised of a single piece of wire; wherein the first primary coil is wound around the coil form in at least two layers; wherein the winding of the first primary coil around the coil form begins at a first end of the coil form, proceeds to a second end of the coil form, and then changes direction and continues from the second end of the coil form back to the first end of the coil form, thereby forming the first two layers of the first primary coil; wherein the first secondary coil is comprised of a single piece of wire; wherein the first secondary coil is wrapped around the first primary coil in multiple stepped layers; wherein each stepped layer of the first secondary coil comprises at least two layers of wire; wherein the winding of the first secondary coil around the first primary coil begins at a first end of the first primary coil, proceeds to a certain distance short of a second end of the first primary coil, and then changes direction and continues back to the first end of the first primary coil, thereby forming a first stepped layer in the first secondary coil; wherein the winding of the first secondary coil continues to form a second stepped layer by proceeding from the first end of the first primary coil to a certain distance short of the point at which the first stepped layer of the first secondary coil changed direction, changing direction and continuing back to the first end of the first primary coil, thereby forming the second stepped layer in the first secondary coil; wherein each subsequent stepped layer of the first secondary coil is wound by beginning at the first end of the primary coil, winding toward the second end of the first primary coil, changing direction a certain distance short of the point at which the previous stepped layer changed direction, and continuing back to the first end of the first primary coil; wherein the first secondary coil comprises a first stepped layer and a last stepped layer; wherein the distance between the second end of the first primary coil and the first stepped layer of the first secondary coil is shorter than the distance between the second end of the first primary coil and any other stepped layer of the first secondary coil; wherein the distance between the second end of the first primary coil and the last stepped layer of the first secondary coil is longer than the distance between the second end of the first primary coil and any other stepped layer of the first secondary coil; wherein the second secondary coil is comprised of a single piece of wire; wherein the second secondary coil is wrapped around the first primary coil in multiple stepped layers; wherein each stepped layer of the second secondary coil comprises at least two layers of wire; wherein the winding of the second secondary coil around the first primary coil begins at the second end of the first primary coil, proceeds to the end of the first stepped layer of the first secondary coil where the winding of the first secondary coil changed direction, changes direction and continues back to the second end of the first primary coil, thereby forming a first stepped layer in the second secondary coil; wherein the winding of the second secondary coil continues to form a second stepped layer by proceeding from the second end of the first primary coil to the end of the second stepped layer of the first secondary coil where the winding of the first secondary coil changed direction, changes direction and continues back to the second end of the first primary coil, thereby forming the second stepped layer in the first secondary coil; wherein each stepped layer of the first secondary coil corresponds to a stepped layer of the second secondary coil; wherein each subsequent stepped layer of the second secondary coil is wound by beginning at the second end of the first primary coil, winding toward the point at which the winding of the corresponding stepped layer of the first secondary coil changed direction, changing direction and continuing back to the second end of the first primary coil; wherein the second secondary coil comprises a first stepped layer and a last stepped layer; wherein the distance between steps in the second secondary coil is equal to the distance between steps in the first secondary coil; wherein the length of each corresponding stepped layer in the first secondary coil and the second secondary coil is equal to the distance from the first end of the first primary coil to the second end of the first primary coil; wherein the second primary coil is wound around the last layers of the first and second secondary coils; wherein the first and second secondary coils each comprises a thick portion; wherein there is an inductive coupling between the first primary coil and the first secondary coil, between the first primary coil and the second secondary coil, between the second primary coil and the second secondary coil, and between the second primary coil and the first secondary coil; wherein the first primary coil is in physical proximity to the thick portion of the first secondary coil, and the second primary coil is in physical proximity to the thick portion of the second secondary coil; wherein the inductive coupling between the first primary coil and the first secondary coil is larger than the inductive coupling between the first primary coil and the second secondary coil, and the inductive coupling between the second primary coil and the second secondary coil is larger than the inductive coupling between the second primary coil and the first secondary coil; and wherein the inductive couplings between the primary and secondary coils cause null position to be physically centered within the transformer.

In yet another embodiment, the present invention is a linear variable differential transformer comprising: a coil form; a first primary coil; a second primary coil; a first secondary coil; and a second secondary coil; wherein the first primary coil is comprised of a single piece of wire; wherein the first primary coil is wound around the coil form in at least two layers; wherein the winding of the first primary coil around the coil form begins at a first end of the coil form, proceeds to a second end of the coil form, and then changes direction and continues from the second end of the coil form back to the first end of the coil form, thereby forming the first two layers of the first primary coil; wherein the first secondary coil is comprised of a single piece of wire; wherein the first secondary coil is wrapped around the first primary coil in multiple stepped layers; wherein each stepped layer of the first secondary coil comprises at least two layers of wire; wherein the winding of the first secondary coil around the first primary coil begins at a first end of the first primary coil, proceeds to a certain distance short of a second end of the first primary coil, and then changes direction and continues back to the first end of the first primary coil, thereby forming a first stepped layer in the first secondary coil; wherein the winding of the first secondary coil continues to form a second stepped layer by proceeding from the first end of the first primary coil to a certain distance short of the point at which the first stepped layer of the first secondary coil changed direction, changing direction and continuing back to the first end of the first primary coil, thereby forming the second stepped layer in the first secondary coil; wherein each subsequent stepped layer of the first secondary coil is wound by beginning at the first end of the primary coil, winding toward the second end of the first primary coil, changing direction a certain distance short of the point at which the previous stepped layer changed direction, and continuing back to the first end of the first primary coil; wherein the first secondary coil comprises a first stepped layer and a last stepped layer; wherein the distance between the second end of the first primary coil and the first stepped layer of the first secondary coil is shorter than the distance between the second end of the first primary coil and any other stepped layer of the first secondary coil; wherein the distance between the second end of the first primary coil and the last stepped layer of the first secondary coil is longer than the distance between the second end of the first primary coil and any other stepped layer of the first secondary coil; wherein the distance between the second end of the first primary coil and the point at which the winding of the first stepped layer of the first secondary coil changes direction is equal to the distance between the point at which the winding of each subsequent stepped layer of the first secondary coil changes direction and the point at which the winding of the previous stepped layer of the first secondary coil changes direction, thereby creating uniform steps in the first secondary coil; wherein the second secondary coil is comprised of a single piece of wire; wherein the second secondary coil is wrapped around the first primary coil in multiple stepped layers; wherein each stepped layer of the second secondary coil comprises at least two layers of wire; wherein the winding of the second secondary coil around the first primary coil begins at the second end of the first primary coil, proceeds to the end of the first stepped layer of the first secondary coil where the winding of the first secondary coil changed direction, changes direction and continues back to the second end of the first primary coil, thereby forming a first stepped layer in the second secondary coil; wherein the winding of the second secondary coil continues to form a second stepped layer by proceeding from the second end of the first primary coil to the end of the second stepped layer of the first secondary coil where the winding of the first secondary coil changed direction, changes direction and continues back to the second end of the first primary coil, thereby forming the second stepped layer in the first secondary coil; wherein each stepped layer of the first secondary coil corresponds to a stepped layer of the second secondary coil; wherein each subsequent stepped layer of the second secondary coil is wound by beginning at the second end of the first primary coil, winding toward the point at which the winding of the corresponding stepped layer of the first secondary coil changed direction, changing direction and continuing back to the second end of the first primary coil; wherein the second secondary coil comprises a first stepped layer and a last stepped layer; wherein the distance between the second end of the first primary coil and the point at which the winding of the first stepped layer of the second secondary coil changes direction is equal to the distance between the point at which the winding of each subsequent stepped layer of the second secondary coil changes direction and the point at which the winding of the previous stepped layer of the second secondary coil changes direction, thereby creating uniform steps in the second secondary coil; wherein the distance between steps in the second secondary coil is equal to the distance between steps in the first secondary coil; wherein the length of each corresponding stepped layer in the first secondary coil and the second secondary coil is equal to the distance from the first end of the first primary coil to the second end of the first primary coil; wherein the second primary coil is wound around the last layers of the first and second secondary coils; wherein the first and second secondary coils each comprises a thick portion; wherein there is an inductive coupling between the first primary coil and the first secondary coil, between the first primary coil and the second secondary coil, between the second primary coil and the second secondary coil, and between the second primary coil and the first secondary coil; wherein the first primary coil is in physical proximity to the thick portion of the first secondary coil, and the second primary coil is in physical proximity to the thick portion of the second secondary coil; wherein the inductive coupling between the first primary coil and the first secondary coil is larger than the inductive coupling between the first primary coil and the second secondary coil, and the inductive coupling between the second primary coil and the second secondary coil is larger than the inductive coupling between the second primary coil and the first secondary coil; and wherein the inductive couplings between the primary and secondary coils cause null position to be physically centered within the transformer.

Preferably, the primary coil is of a constant thickness. In a preferred embodiment, the present invention further comprising a moveable core and a connecting rod; wherein the moveable core is situated inside of the coil form, wherein the connecting rod connects the moveable core to an external device that causes the connecting rod and moveable core to move laterally inside the coil form; wherein magnetic flux induces voltages in the first and second secondary coils; and wherein the magnitude of the voltage induced in each secondary coil is a function of input voltage to the primary coil and position of the moveable core relative to the secondary coil. Preferably, the moveable core is comprised of a material having high magnetic permeability and low magnetic hysteresis.

In a preferred embodiment, the transformer has an overall length, wherein the transformer produces an output voltage, and wherein the output voltage is substantially linearly proportional to the displacement of the moveable core over a length equal to approximately at least seventy percent of the overall length of the device. The coil form is preferably comprised of a material that has low magnetic hysteresis and low magnetic permeability. The primary and secondary coils are preferably comprised of insulated wire having high electrical conductivity.

In a preferred embodiment, each of the primary, first secondary and second secondary coils comprises a pitch, and the pitch of each coil is both constant and narrow. Preferably, the present invention further comprises an electrical connection, wherein the electrical connection is installed between the first secondary coil and second secondary coil. Preferably, each step comprises a length, and voltage output to the secondary coils can be controlled by increasing or decreasing the step length. Alternately, each step comprises a length, the length of all of the steps in a single transformer is uniform, and voltage output to the secondary coils can be controlled by increasing or decreasing the step length.

In one embodiment, the transformer is connected to a variable-area flowmeter; wherein the transformer-flowmeter assembly is in a housing that is designed to fit within well tubing having an inside diameter of approximately two inches; wherein the length of the coil form is approximately seven inches; wherein each step comprises a length, wherein the length of all of the steps in a single transformer except for the two steps at either end of the transformer is uniform, and wherein the step length is approximately one inch; wherein each secondary coil has six steps; wherein the moveable core is approximately slightly more than two inches long; and wherein excitation voltage is provided to the primary coil as well as AC to DC output signal conversion. Alternately, the transformer is connected to a variable-area flowmeter; wherein the transformer-flowmeter assembly is in a housing that is designed to fit within well tubing having an inside diameter of approximately two inches; wherein the length of the coil form is approximately seven inches; wherein each step comprises a length, wherein the length of all of the steps in a single transformer is uniform, and wherein the step length is approximately one inch; wherein each secondary coil has six steps; wherein the moveable core is approximately slightly more than two inches long; and wherein excitation voltage is provided to the primary coil as well as AC to DC output signal conversion.

In the embodiments comprising two primary coils, the first and second primary coils may be comprised of the same wire. Alternately, they may be comprised of two different wires that are connected to each other.

In all of the above embodiments, the first and second secondary coils may be comprised of the same wire. Alternately, they may be comprised of two different wires that are connected to one another.

BRIEF DESCRIPTION OF THE DRAWINGS

FIG. 2A is a diagram that explains the meaning of the term "pitch" in the context of the present invention.

FIG. 6 is a longitudinal cross-section schematic view of a second embodiment of the present invention comprising two primary coils.

REFERENCE NUMBERS

Figure 1:
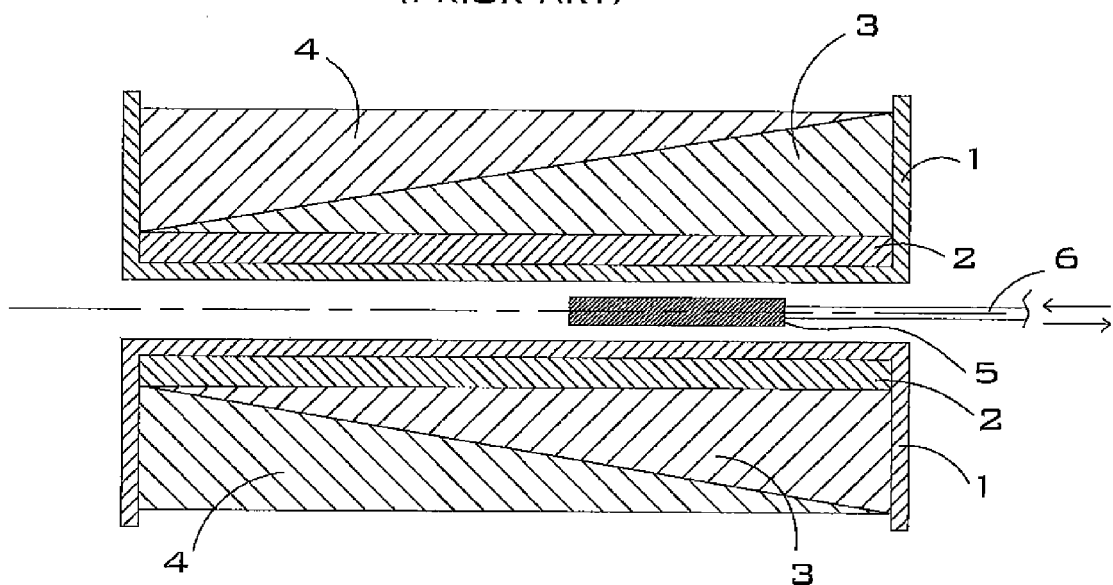
FIG. 1 is a longitudinal cross-section schematic view of a prior art tapered-coil LVDT.

1 Coil form
2 Primary coil
3 First secondary coil
4 Second secondary coil
5 Moveable core
6 Connecting rod
7 Primary excitation contacts
8 Secondary output signal contacts
9 LVDT with stepped secondary windings
10 First layer of first secondary coil
11 Second layer of first secondary coil
12 Third layer of first secondary coil
13 Fourth layer of first secondary coil
14 Fifth layer of first secondary coil 15 Sixth layer of first secondary coil
16 First layer of second secondary coil
17 Second layer of second secondary coil
18 Third layer of second secondary coil
19 Fourth layer of second secondary coil
20 Fifth layer of second secondary coil
21 Sixth layer of second secondary coil
22 Step length
23 Second primary coil

DETAILED DESCRIPTION OF INVENTION

The present invention overcomes the deficiencies in prior art devices by providing, in a first embodiment, two continuous and complimentary secondary coils that are wound in stepped layers, in contrast to the tapered coils or individual coil segments described in the prior art. This design provides linear output response over a relatively long range of core displacement and requires a minimum number of internal electrical connections. The design is relatively easy to manufacture by either machine or manual methods. The two secondary coils of the present invention are connected in series with matching polarity, as opposed to the prior art of Lipshutz and others whose secondary coils are connected in opposite phase. A center-tap electrical connection is also provided between the two coils so that the voltage of each secondary coil may be measured independently of the other. By this means, it is possible to measure both the sum and difference of the two secondary voltages independently and simultaneously, using external electronic components.

In a second embodiment of the present invention, a second primary coil is wound outside of the two secondary coils, in addition to the inner primary coil of the first and second embodiments. The combination of the internal and external primary coils surrounding the secondary coils helps to balance the flux that is induced from the primary coils to the secondary coil arrays, so that the null point of the device can be made to coincide with the moveable core situated at the physical center of the secondary coil array, thereby increasing the linear range of the device. In this embodiment, the voltages induced to each of the two secondary coils are identical when the moveable coil is located at the physical center of the coil array because of the physical proximity of the secondary primary coil to the second secondary coil.

Figure 2:
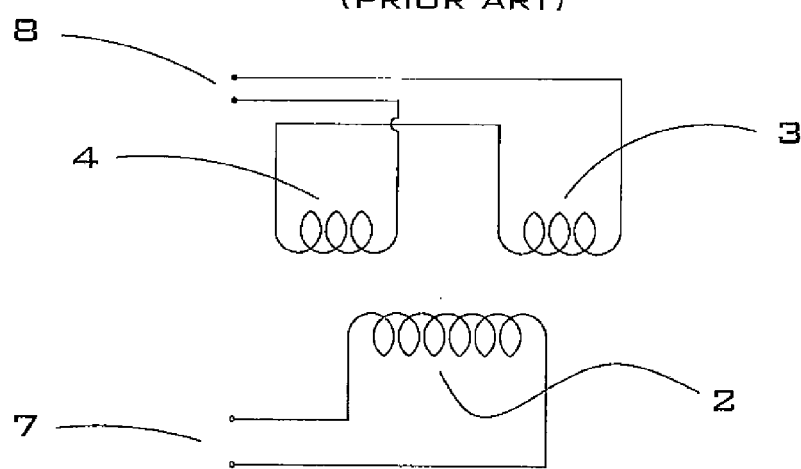
FIG. 2 is an electrical schematic drawing of the device shown in FIG. 1.

The present invention may best be understood by comparing it with the prior art. FIG. 1 is a longitudinal cross-section schematic view of a prior art tapered-coil LVDT. This drawing was taken from the Lipshutz patent (U.S. Pat. No. 3,054,976). Major components include hollow coil form (or mandrel) 1, primary coil 2, first secondary coil 3, second secondary coil 4, moveable core 5, and non-ferrous connection rod 6. FIG. 2 is an electrical schematic of the device shown in FIG. 1. Primary coil 2 is wrapped around cylindrically-shaped coil form 1. First secondary coil 3 is wrapped over primary coil 2 in a tapered shape, with a maximum number of wire wraps at the right end of the coil and a minimum number of wire wraps on the left end of the coil, as shown. Second secondary coil 4 is wrapped in complementary form over first secondary coil 3. As shown in FIG. 2, primary coil 2 terminates in excitation contacts 7, and secondary coils 3, 4 terminate in output signal contacts 8. Moveable core 5 is made from iron or other material having significant magnetic permeability. When alternating electrical current flows through primary coil 2, a portion of the input voltage is coupled to secondary coils 3, 4 via the moveable core 5, and may be measured at output contacts 8.

Since the secondary coils 3, 4 are wired with opposite polarity as shown in FIG. 2, the signal produced at the output contacts 8 is the difference between the induced voltage in the secondary coils 3, 4.

The amount of mutual inductance between primary coil 2 and secondary coils 3, 4 is a function of the physical position of moveable core 5. Referring to FIG. 1, when moveable core 5 is located near the right side of the device (as shown), the core is in proximity to the thick portion of first secondary coil 3, and is distant from the thick portion of second secondary coil 4. The induced voltage in the secondary coils 3, 4 is a function of the number of wire wraps in each coil and their proximity to the core 5; therefore, there will be a higher voltage induced in first secondary coil 3 than in second secondary coil 4 when the core is near the right side of the device, because coil 3 is thicker than coil 4 in the zone surrounding core 5. As the core 5 moves from right to left, it progressively induces more voltage into coil 4 and less voltage into coil 3, due to the varying thicknesses of each coil. At some particular point of core 5 displacement within the coil form 1, the voltages induced in the two coils 3, 4 are of equal magnitude (but opposite polarity), resulting in a zero output voltage at the output contacts 8. This position of the core is referred to as the "null position." Lipshutz noted that the null position does not correspond to the core being in the physical center of the device, since the first secondary coil 3 is closer than second secondary coil 4 to the core 5 when the core 5 is centered in the device. This distance difference of the two coils 3, 4 results in more voltage induced into the closer coil.

Although the device shown in FIG. 1 is straightforward from a theoretical standpoint, the actual physical construction of such a device with tapered windings is not described by Lipshutz. Physical construction of the tapered windings described in FIG. 1 may be difficult or not possible to achieve. For example, consider a secondary coil having dimensions similar to a unit constructed using the design of the present invention, having a wire diameter of 0.006 inch (34 gauge), a coil length of 3 inches, and a maximum thickness of 12 wire layers. Such a coil could not be physically constructed without a widely-spaced or non-uniform pitch of the coil wires. This arrangement would result in less wire length in the coil than if the adjacent wires on a layer were touching each other (i.e., narrow pitch, as is the case in the present invention), and the performance of the device would be adversely affected due to the reduced total wire length in the coil. In the context of the present invention, the term "pitch" refers to the spacing between adjacent wire wraps of the same coil. See FIG. 2A.

Figure 3:
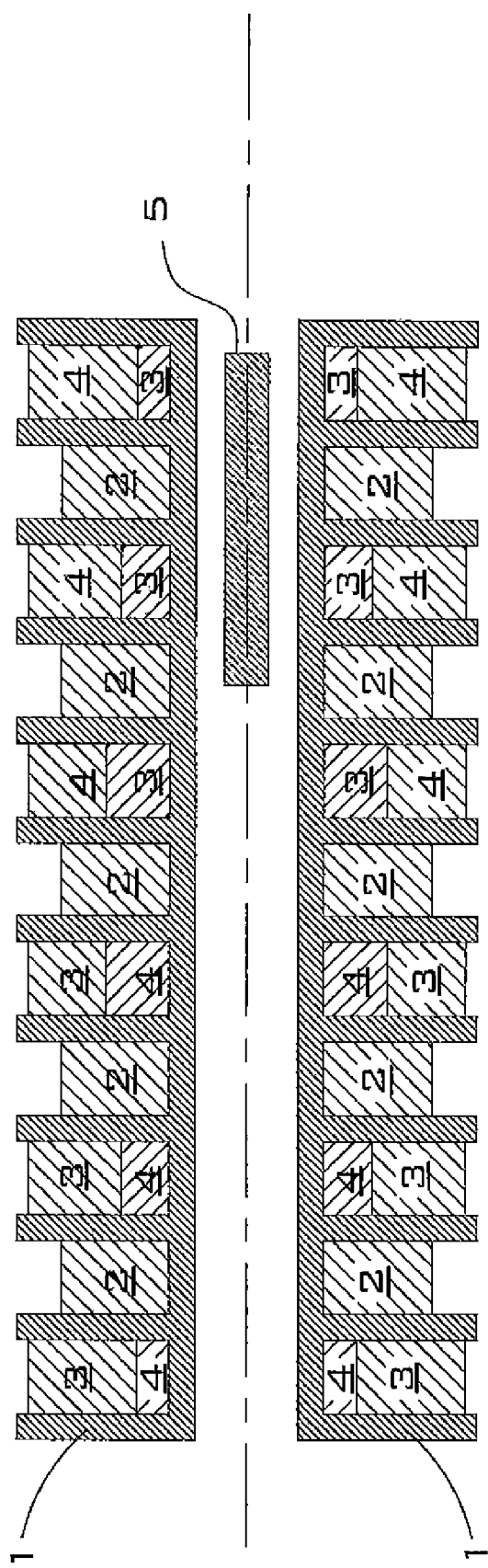
FIG. 3 is a longitudinal cross-section schematic view of a prior art LVDT utilizing multiple discreet coils.

FIG. 3 illustrates an alternative embodiment of the prior art, also described in the Lipshutz patent. In this embodiment, multiple discrete coils are wound around a coil form 1 that comprises raised ribs to confine the coil wraps. As shown, the device incorporates multiple primary coils 2, multiple first secondary coils 3, multiple second secondary coils 4, and moveable core 5. Although this embodiment eliminates the requirement for winding tapered coils, it does require winding multiple small coils, which requires more labor than winding fewer large coils. Some currently available commercial devices use a variation of this embodiment, in which the coils are pre-wound on individual bobbins, then placed on the coil form and connected electrically. This arrangement requires numerous electrical connections on the fine coil wires in order to join the individual coils that make up the first secondary, the second secondary and the primary coils.

Figure 4:
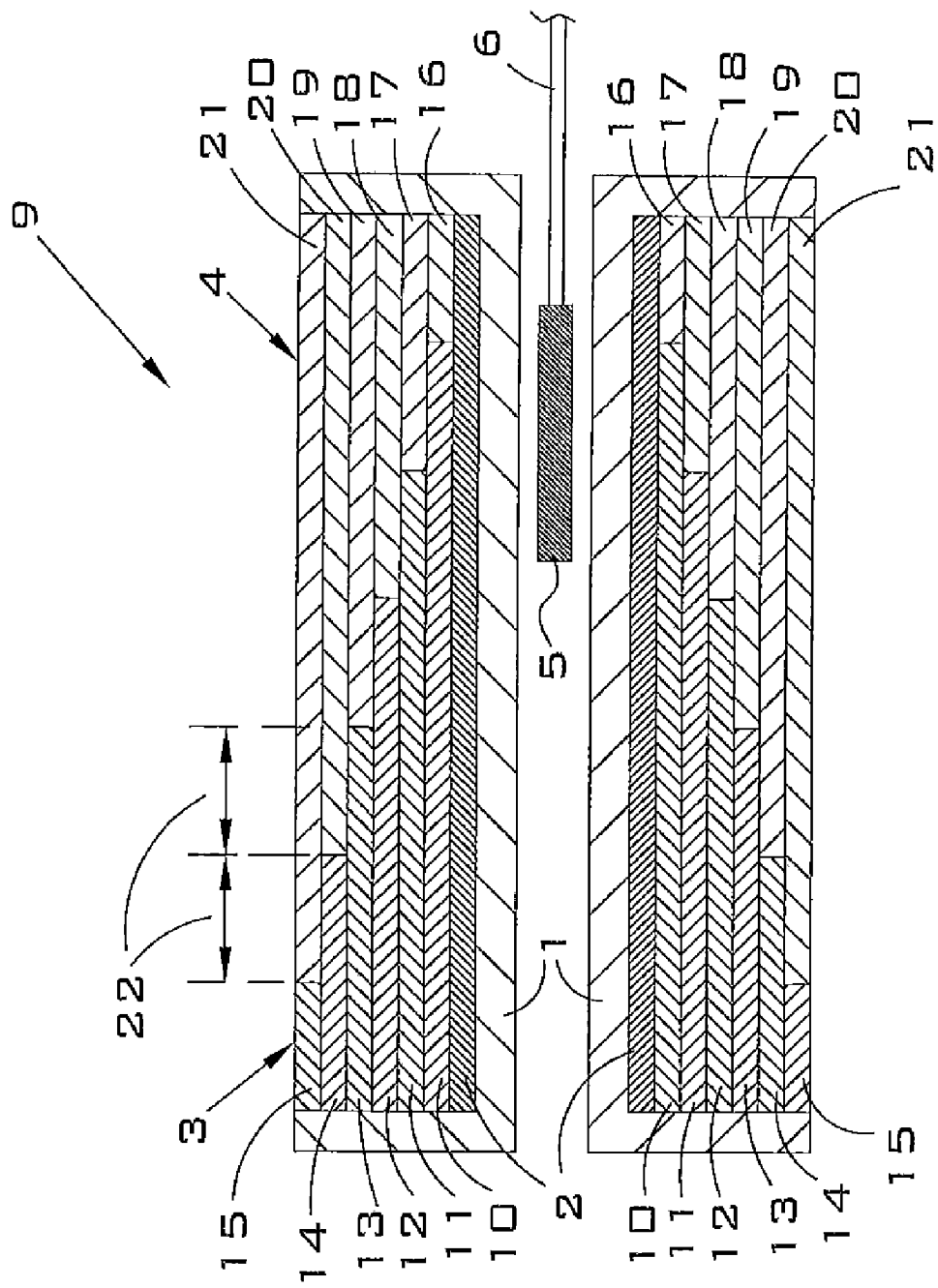
FIG. 4 is a longitudinal cross-section schematic view of a first embodiment of the present invention comprising a single primary coil.

FIG. 4 is a longitudinal cross-section schematic view of a first embodiment of the present invention. As shown in the figure, stepped-coil LVDT 9 is comprised of coil form 1, primary coil 2, first secondary coil 3, second secondary coil 4, moveable core 5, and connecting rod 6. As shown in the figure, first secondary coil 3 is comprised of multiple stepped layers, including first layer 10, second layer 11, third layer 12, fourth layer 13, fifth layer 14 and sixth layer 15. Similarly, second secondary coil 4 is comprised of first layer 16, second layer 17, third layer 18, fourth layer 19, fifth layer 20 and sixth layer 21. The difference in length between any two adjacent secondary coil layers is identified as step length 22; for example, the length of first layer 10 is one step length longer than the length of second layer 11. (Coil form 1 is ideally comprised of a material that has low magnetic hysteresis and low magnetic permeability. Phenolic is an example of a suitable material for the coil form 1. Coils 2, 3, 4 are ideally comprised of insulated wire having high electrical conductivity, such as copper magnet wire. Moveable core 5 is ideally comprised of a material having high magnetic permeability and low magnetic hysteresis, such as perm alloy or mu-metal.

In a preferred embodiment, the step lengths are uniform; however, an alternate embodiment (not shown) could be constructed in which not all of the steps are of equal length. For example, the steps closest to the end of each device might be lengthened to assist in confining the flux at either end of the device.

The device works as follows: referring to FIG. 4, moveable core 5 is positioned near the right edge of the coil form 1. Connecting rod 6 is connected to an external device (not shown), which causes the connecting rod 6 and moveable core 5 to move laterally in response to a physical parameter that varies. For example, the external device may be a flowmeter with a piston that causes the connecting rod 6 to move to the left with increasing water flow through the flowmeter. With moveable core 5 at the position shown in FIG. 4, magnetic flux induces voltages in first secondary coil 3 and second secondary coil 4. The magnitude of the voltage induced in each secondary coil 3, 4 is a function of the magnitude of the magnetic flux passing through that coil. The magnitude of the magnetic flux passing through each secondary coil is a function of (i) the input voltage to the primary coil and (ii) the position of the moveable core relative to the secondary coil. The magnetic flux produced by primary coil 2 is focused or concentrated by moveable core 5.

As shown in the figure, moveable core 5 is surrounded by all six layers (16 through 21) of second secondary coil 4, but is surrounded only by layers 10 and 11 of first secondary coil 3; therefore, the magnetic flux surrounding core 5 induces more voltage into second secondary coil 4 than in first secondary coil 3, because second secondary coil 4 has more wire wraps that intercept the magnetic flux field surrounding core 5. As the connecting rod 6 pushes core 5 toward the left, the magnetic flux field surrounding core 5 progressively intercepts more wire turns from first secondary coil 3 and fewer wire turns from second secondary coil 4; therefore, as core 5 moves from right to left, the voltage produced in first secondary coil 3 increases, and the voltage produced in second secondary coil 4 decreases. By measuring and comparing the two voltages, the position of core 5 and connecting rod 6 can be accurately determined. This core position can be correlated to a parameter that is desired to be measured; for example, the flow rate of a liquid passing through an external device that produces movement of core 5 and connecting rod 6.

A preferred method of constructing the first embodiment of the present invention is as follows: referring to FIG. 4, a cylindrical coil form 1 is fabricated from a composite tube so as to have a longitudinal length of 7 inches. Primary coil 2 is constructed of 34-gage magnet wire, which is wrapped over coil form 1 so as to form two layers of wire, with adjacent turns touching. In the examples provided herein, the primary and secondary coils each consists of two layers; however, the present invention is not limited to any particular number of layers. In fact, the primary coil and secondary coils could each be comprised of more than two layers of wire.

Primary coil 2 is comprised of a single length of wire, by winding the first layer on coil form 1 from left to right then wrapping the second layer back over the first layer from right to left. After primary coil 2 is constructed, first layer 10 of first secondary coil 3 is installed by wrapping a layer of 34-gage magnet wire over the top of primary coil 2, starting at the left edge of coil form 1 and extending the wrap for a distance of 6 inches, then wrapping a second wire layer back over the top of the first layer, and ending back at the left edge of the coil form. When completed, first layer 10 is comprised of two layers of wire, with adjacent turns touching. Second layer 11 is constructed by wrapping all additional two layers of wire over the top of first layer 10, to a length of 5 inches. Similarly, layers 12, 13, 14, and 15 are sequentially wrapped over the previous layers, with each step 22 being comprised of two layers of wire, and the length of each step being one inch shorter than the previous step. All of the layers 10 through 15 are wound from one continuous length of wire; therefore, no electrical connections are required between first secondary coil 3 wire layers 10 through 15.

Second secondary coil 4 is then constructed by wrapping first layer 16, starting at the right edge of coil form 1, ending at the edge of first layer 10 of first secondary coil 3, then wrapping a second layer over the first, finally ending the wrap at the right edge of coil form 1. Similarly, layers 17 through 21 are wrapped as shown in FIG. 4, with each layer comprised of two layers of wire coils, and each step 22 having a length one inch longer than the previously wrapped coil. All of the layers 16 through 21 are wound from one continuous length of wire; therefore, no electrical connections are required between the second secondary coil 4 wire layers 16 through 21. A electrical connection with external contact (not shown) is preferably installed between first secondary coil 3 and second secondary coil 4 in order to provide a center-tap electrical connection, which allows the voltage of each secondary coil to be measured independently of the other using external electronic components.

The completed LVDT may then be connected to a variable-area flowmeter. In a preferred embodiment, the LVDT-flowmeter assembly is designed and constructed in order to measure water flows in extraction wells for the coalbed methane industry. This LVDT-flowmeter assembly is encased in a pressure-tight housing that is designed to fit within well tubing having an inside diameter of 2 inches. The LVDT has a coil mandrel length of 7 inches. The device has a single primary coil. The two secondary coils each have six steps, with a step length of 1 inch. The moveable core length is 2.120 inches, or slightly more than twice the 1.0-inch step length of the secondary coils, as shown in FIG. 3. A commercial integrated circuit chip (Analog Devices AD598 LVDT Signal Conditioner) is used to provide primary coil excitation voltage as well as the AC to DC output signal conversion.

Figure 5:
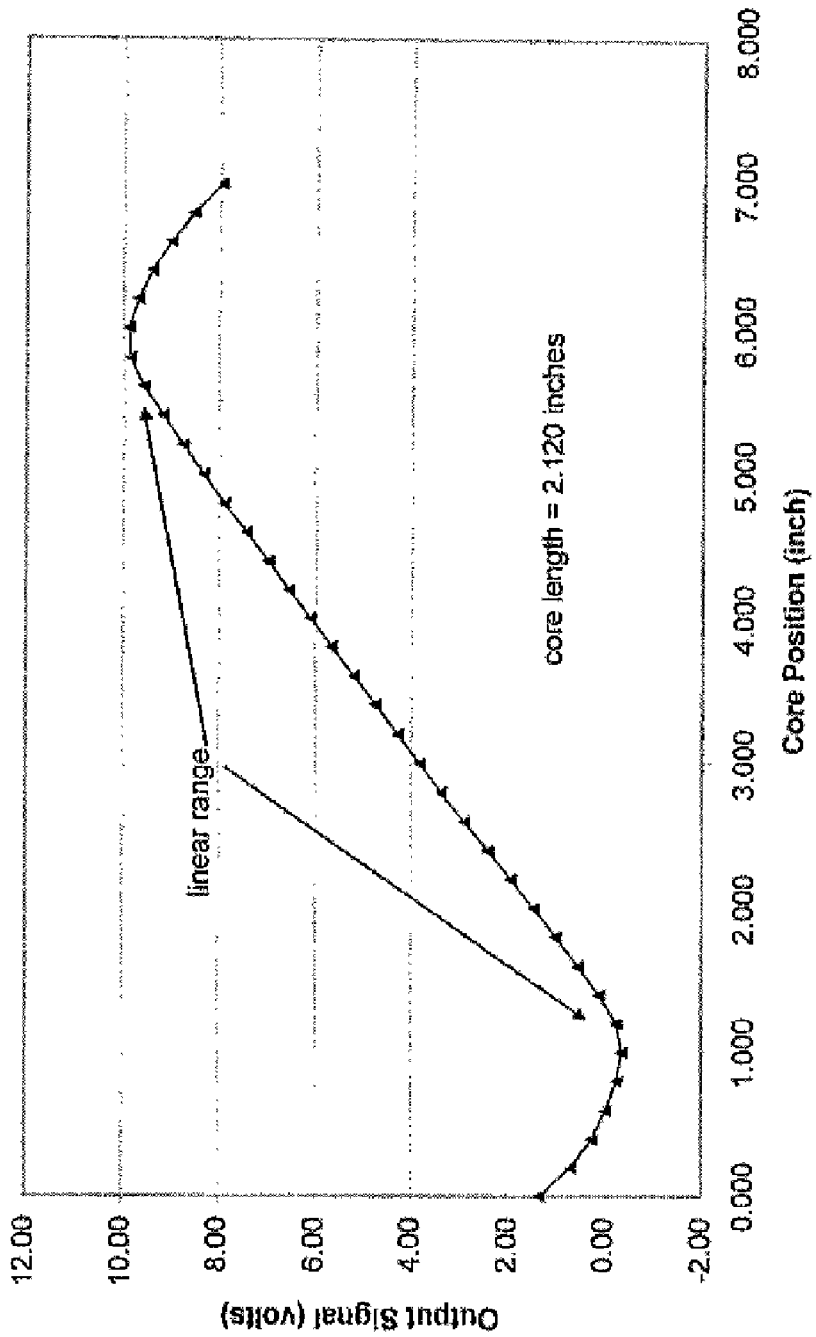
FIG. 5 is a response curve of output voltage versus core position for the first embodiment of the present invention.

FIG. 5 shows the output characteristics of this LVDT device. As shown in the figure, the output signal for the device is essentially linearly proportional to the position of the moveable core for a displacement range of approximately 5 inches. In these tests, the output voltage of the LVDT was computed ratiometrically, as:

$$V_{out} = (V_{fs} - V_{ss})/(V_{fs} + V_{ss})$$

where $V_{out}$ is the computed output voltage, $V_{fs}$ is the measured voltage across the first secondary coil, and VSS is the measured voltage across the second secondary coil. This ratiometric method of determining output voltage reduces errors due to input voltage drift, and also produces a scaled unipolar voltage (eliminating the null position or zero output voltage point). The ratiometric measurement was made internally by the AD598 integrated circuit device for these tests.

As shown in FIG. 5, the linear output range for a seven-inch device is roughly five inches (i.e., from one inch to six inches on the chart). Thus, in the present invention, the configuration of the coils and moveable core result in an output voltage that is substantially linearly proportional to the displacement of the moveable core over a length equal to approximately at least seventy percent (70%) of the overall length of the device.

FIG. 6 is a cross-section schematic view of a second embodiment of the invention. The second embodiment is identical to the first embodiment shown in FIG. 4, except that the second embodiment comprises a second primary coil 23, which is wound over the top of secondary coils 3, 4. Second primary coil 23 is physically close to the thick portion of second secondary coil 4, while first primary coil 2 is physically close to the thick portion of first secondary coil 3. Due to this arrangement, first primary coil 2 is better inductively coupled to first secondary coil 3, while second primary coil 23 is better inductively coupled to second secondary coil 4. The coupling differences are offsetting, thereby resulting in a device having a "null position" that is physically centered within the device, and eliminating the problem of null position offset that was noted by Lipshutz. In the second embodiment, the two primary coils may be the same wire, or they may be two separate wires that are connected externally. The input voltage may be supplied to the primary coils either in series or in parallel.

The present invention may be manufactured in various sizes, with various ranges of linear response.

The present invention has several advantages over prior art. First, the stepped layer design of the first and second embodiments of the present invention eliminate the manufacturing difficulties of the tapered layer design and of the non-ribbed, multiple-coil design that are described by Lipshutz. Second, the continuous secondary windings of the present invention are simpler and faster to fabricate than the multiple stacked coils with edge supports or bobbins that are described by Lipshutz, and those that are utilized in currently available LVDTs.

Third, because the secondary coils of the present invention may each be wound using one continuous length of wire, only one internal electrical connection is required (a center-tap connection between the secondary coils). The multiple-coil LVDTs of Lipshutz require two internal electrical connections for each of the approximately 15 coils; therefore, the present invention has fewer manufacturing steps and fewer failure-prone connections than the prior art devices.

Fourth, in the present invention, a linear output signal is produced directly from the output of the secondary coils, thereby eliminating the electronic linearization circuitry required by the devices of Nijdam and Schmidt. Fifth, the coil windings of the present invention have a constant pitch, in contrast to the variable-pitch windings required by the Schmidt device, which are relatively expensive to manufacture. In addition, a closely spaced constant pitch device arguably provides a higher output (i.e., more sensitivity to small displacements) than a variable pitch device having the same dimensions.

Sixth, the output voltage amplification of the present invention may be easily controlled during manufacture by varying the step length of the secondary coils layers (i.e., smaller steps would result in a device with greater amplification, which means that the output would vary more for small displacements). In this manner, the device may be produced to match various mechanical devices that have different ranges of rectilinear displacement. For example, for a flowmeter that measures water flow over a range of 0 to 30 gallons per minute in a two-inch diameter pipe, the displacement range of the core would be about five inches. This would correspond to a step length of about one inch and an overall device length of about seven inches. For an LVDT that measured bridge sway over a range of 0.5 inch, the step length might be 0.1 inch, and the overall length of the device might be 0.7 inch.

Finally, the outer primary winding of the second embodiment of the present invention eliminates the "null point" problem of Lipshutz's design without the necessity of external electronic components. Alternately, the null-point problem may be eliminated in the first embodiment of the present invention by the use of external electronic circuitry that converts alternating-current output signals of the two secondary coils into a unipolar direct current signal.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A linear variable differential transformer comprising:
   (a) a coil form;
   (b) a single primary coil;
   (c) a first secondary coil; and
   (d) a second secondary coil;
   wherein the primary coil is comprised of a single piece of wire;
   wherein the primary coil is wound around the coil form in at least two layers;
   wherein the winding of the primary coil around the coil form begins at a first end of the coil form, proceeds to a second end of the coil form, and then changes direction and continues from the second end of the coil form back to the first end of the coil form, thereby forming the first two layers of the primary coil;
   wherein the first secondary coil is comprised of a single piece of wire;
   wherein the first secondary coil is wrapped around the primary coil in multiple stepped layers;
   wherein each stepped layer of the first secondary coil comprises at least two layers of wire;
   wherein the winding of the first secondary coil around the primary coil begins at a first end of the primary coil, proceeds to a certain distance short of a second end of the primary coil, and then changes direction and continues back to the first end of the primary coil, thereby forming a first stepped layer in the first secondary coil;

wherein the winding of the first secondary coil continues to form a second stepped layer by proceeding from the first end of the primary coil to a certain distance short of the point at which the first stepped layer of the first secondary coil changed direction, changing direction and continuing back to the first end of the primary coil, thereby forming the second stepped layer in the first secondary coil;

wherein each subsequent stepped layer of the first secondary coil is wound by beginning at the first end of the primary coil, winding toward the second end of the primary coil, changing direction a certain distance short of the point at which the previous stepped layer changed direction, and continuing back to the first end of the primary coil;

wherein the first secondary coil comprises a first stepped layer and a last stepped layer;

wherein the distance between the second end of the primary coil and the first stepped layer of the first secondary coil is shorter than the distance between the second end of the primary coil and any other stepped layer of the first secondary coil;

wherein the distance between the second end of the primary coil and the last stepped layer of the first secondary coil is longer than the distance between the second end of the primary coil and any other stepped layer of the first secondary coil;

wherein the second secondary coil is comprised of a single piece of wire;

wherein the second secondary coil is wrapped around the primary coil in multiple stepped layers;

wherein each stepped layer of the second secondary coil comprises at least two layers of wire;

wherein the winding of the second secondary coil around the primary coil begins at the second end of the primary coil, proceeds to the end of the first stepped layer of the first secondary coil where the winding of the first secondary coil changed direction, changes direction and continues back to the second end of the primary coil, thereby forming a first stepped layer in the second secondary coil;

wherein the winding of the second secondary coil continues to form a second stepped layer by proceeding from the second end of the primary coil to the end of the second stepped layer of the first secondary coil where the winding of the first secondary coil changed direction, changes direction and continues back to the second end of the primary coil, thereby forming the second stepped layer in the first secondary coil;

wherein each stepped layer of the first secondary coil corresponds to a stepped layer of the second secondary coil;

wherein each subsequent stepped layer of the second secondary coil is wound by beginning at the second end of the primary coil, winding toward the point at which the winding of the corresponding stepped layer of the first secondary coil changed direction, changing direction and continuing back to the second end of the primary coil;

wherein the second secondary coil comprises a first stepped layer and a last stepped layer;

wherein the distance between steps in the second secondary coil is equal to the distance between steps in the first secondary coil; and wherein the length of each corresponding stepped layer in the first secondary coil and the second secondary coil is equal to the distance from the first end of the primary coil to the second end of the primary coil.

2. A linear variable differential transformer comprising:
(a) a coil form;
(b) a single primary coil;
(c) a first secondary coil; and
(d) a second secondary coil;

wherein the primary coil is comprised of a single piece of wire;

wherein the primary coil is wound around the coil form in at least two layers;

wherein the winding of the primary coil around the coil form begins at a first end of the coil form, proceeds to a second end of the coil form, and then changes direction and continues from the second end of the coil form back to the first end of the coil form, thereby forming the first two layers of the primary coil;

wherein the first secondary coil is comprised of a single piece of wire;

wherein the first secondary coil is wrapped around the primary coil in multiple stepped layers;

wherein each stepped layer of the first secondary coil comprises at least two layers of wire;

wherein the winding of the first secondary coil around the primary coil begins at a first end of the primary coil, proceeds to a certain distance short of a second end of the primary coil, and then changes direction and continues back to the first end of the primary coil, thereby forming a first stepped layer in the first secondary coil;

wherein the winding of the first secondary coil continues to form a second stepped layer by proceeding from the first end of the primary coil to a certain distance short of the point at which the first stepped layer of the first secondary coil changed direction, changing direction and continuing back to the first end of the primary coil, thereby forming the second stepped layer in the first secondary coil;

wherein each subsequent stepped layer of the first secondary coil is wound by beginning at the first end of the primary coil, winding toward the second end of the primary coil, changing direction a certain distance short of the point at which the previous stepped layer changed direction, and continuing back to the first end of the primary coil;

wherein the first secondary coil comprises a first stepped layer and a last stepped layer;

wherein the distance between the second end of the primary coil and the first stepped layer of the first secondary coil is shorter than the distance between the second end of the primary coil and any other stepped layer of the first secondary coil;

wherein the distance between the second end of the primary coil and the last stepped layer of the first secondary coil is longer than the distance between the second end of the primary coil and any other stepped layer of the first secondary coil;

wherein the distance between the second end of the primary coil and the point at which the winding of the first stepped layer of the first secondary coil changes direction is equal to the distance between the point at which the winding of each subsequent stepped layer of the first secondary coil changes direction and the point at which the winding of the previous stepped layer of the first secondary coil changes direction, thereby creating uniform steps in the first secondary coil;

wherein the second secondary coil is comprised of a single piece of wire;

wherein the second secondary coil is wrapped around the primary coil in multiple stepped layers;

wherein each stepped layer of the second secondary coil comprises at least two layers of wire;

wherein the winding of the second secondary coil around the primary coil begins at the second end of the primary coil, proceeds to the end of the first stepped layer of the first secondary coil where the winding of the first secondary coil changed direction, changes direction and continues back to the second end of the primary coil, thereby forming a first stepped layer in the second secondary coil;

wherein the winding of the second secondary coil continues to form a second stepped layer by proceeding from the second end of the primary coil to the end of the second stepped layer of the first secondary coil where the winding of the first secondary coil changed direction, changes direction and continues back to the second end of the primary coil, thereby forming the second stepped layer in the first secondary coil;

wherein each stepped layer of the first secondary coil corresponds to a stepped layer of the second secondary coil;

wherein each subsequent stepped layer of the second secondary coil is wound by beginning at the second end of the primary coil, winding toward the point at which the winding of the corresponding stepped layer of the first secondary coil changed direction, changing direction and continuing back to the second end of the primary coil;

wherein the second secondary coil comprises a first stepped layer and a last stepped layer;

wherein the distance between the second end of the primary coil and the point at which the winding of the first stepped layer of the second secondary coil changes direction is equal to the distance between the point at which the winding of each subsequent stepped layer of the second secondary coil changes direction and the point at which the winding of the previous stepped layer of the second secondary coil changes direction, thereby creating uniform steps in the second secondary coil;

wherein the distance between steps in the second secondary coil is equal to the distance between steps in the first secondary coil; and wherein the length of each corresponding stepped layer in the first secondary coil and the second secondary coil is equal to the distance from the first end of the primary coil to the second end of the primary coil.

3. The linear variable differential transformer of claim 1 or 2, wherein the primary coil is of a constant thickness.

4. The linear variable differential transformer of claim 1 or 2, further comprising a moveable core and a connecting rod, wherein the moveable core is situated inside of the coil form;

wherein the connecting rod connects the moveable core to an external device that causes the connecting rod and moveable core to move laterally inside the coil form;

wherein magnetic flux induces voltages in the first and second secondary coils; and wherein the magnitude of the voltage induced in each secondary coil is a function of input voltage to the primary coil and position of the moveable core relative to the secondary coil.

5. The linear variable differential transformer of claim 4, wherein the moveable core is comprised of a material having high magnetic permeability and low magnetic hysteresis.

6. The linear variable differential transformer of claim 4, wherein the transformer has an overall length, wherein the transformer produces an output voltage, and wherein the output voltage is substantially linearly proportional to the displacement of the moveable core over a length equal to approximately at least seventy percent of the overall length of the device.

7. The linear variable differential transformer of claim 1 or 2, wherein the coil form is comprised of a material that has low magnetic hysteresis and low magnetic permeability.

8. The linear variable differential transformer of claim 1 or 2, wherein the primary and secondary coils are comprised of insulated wire having high electrical conductivity.

9. The linear variable differential transformer of claim 1 or 2, wherein each of the primary, first secondary and second secondary coils comprises a pitch, and wherein the pitch of each coil is both constant and narrow.

10. The linear variable differential transformer of claim 1 or 2, further comprising an electrical connection, wherein the electrical connection is installed between the first secondary coil and second secondary coil.

11. The linear variable differential transformer of claim 1 or 2, wherein each step comprises a length, and wherein voltage output to the secondary coils can be controlled by increasing or decreasing the step length.

12. The linear variable differential transformer of claim 1 or 2, wherein each step comprises a length, wherein the length of all of the steps in a single transformer is uniform, and wherein voltage output to the secondary coils can be controlled by increasing or decreasing the step length.

13. The linear variable differential transformer of claim 1 or 2, wherein the transformer is connected to a variable-area flowmeter;

wherein the transformer-flowmeter assembly is in a housing that is designed to fit within well tubing having an inside diameter of approximately two inches;

wherein the length of the coil form is approximately seven inches;

wherein each step comprises a length, wherein the length of all of the steps in a single transformer except for the two steps at either end of the transformer is uniform, and wherein the step length is approximately one inch;

wherein each secondary coil has six steps;

wherein the moveable core is approximately slightly more than two inches long; and wherein excitation voltage is provided to the primary coil as well as AC to DC output signal conversion.

14. The linear variable differential transformer of claim 1 or 2, wherein the transformer is connected to a variable-area flowmeter;

wherein the transformer-flowmeter assembly is in a housing that is designed to fit within well tubing having an inside diameter of approximately two inches;

wherein the length of the coil form is approximately seven inches;

wherein each step comprises a length, wherein the length of all of the steps in a single transformer is uniform, and wherein the step length is approximately one inch;

wherein each secondary coil has six steps;

wherein the moveable core is approximately slightly more than two inches long; and wherein excitation voltage is provided to the primary coil as well as AC to DC output signal conversion.

15. A linear variable differential transformer comprising:
(a) a coil form;
(b) a first primary coil;
(c) a second primary coil;
(d) a first secondary coil; and
(e) a second secondary coil;
wherein the first primary coil is comprised of a single piece of wire;
wherein the first primary coil is wound around the coil form in at least two layers;
wherein the winding of the first primary coil around the coil form begins at a first end of the coil form, proceeds to a second end of the coil form, and then changes direction and continues from the second end of the coil form back to the first end of the coil form, thereby forming the first two layers of the first primary coil;
wherein the first secondary coil is comprised of a single piece of wire;
wherein the first secondary coil is wrapped around the first primary coil in multiple stepped layers;
wherein each stepped layer of the first secondary coil comprises at least two layers of wire;
wherein the winding of the first secondary coil around the first primary coil begins at a first end of the first primary coil, proceeds to a certain distance short of a second end of the first primary coil, and then changes direction and continues back to the first end of the first primary coil, thereby forming a first stepped layer in the first secondary coil;
wherein the winding of the first secondary coil continues to form a second stepped layer by proceeding from the first end of the first primary coil to a certain distance short of the point at which the first stepped layer of the first secondary coil changed direction, changing direction and continuing back to the first end of the first primary coil, thereby forming the second stepped layer in the first secondary coil;
wherein each subsequent stepped layer of the first secondary coil is wound by beginning at the first end of the primary coil, winding toward the second end of the first primary coil, changing direction a certain distance short of the point at which the previous stepped layer changed direction, and continuing back to the first end of the first primary coil;
wherein the first secondary coil comprises a first stepped layer and a last stepped layer;
wherein the distance between the second end of the first primary coil and the first stepped layer of the first secondary coil is shorter than the distance between the second end of the first primary coil and any other stepped layer of the first secondary coil;
wherein the distance between the second end of the first primary coil and the last stepped layer of the first secondary coil is longer than the distance between the second end of the first primary coil and any other stepped layer of the first secondary coil;
wherein the second secondary coil is comprised of a single piece of wire;
wherein the second secondary coil is wrapped around the first primary coil in multiple stepped layers;
wherein each stepped layer of the second secondary coil comprises at least two layers of wire;
wherein the winding of the second secondary coil around the first primary coil begins at the second end of the first primary coil, proceeds to the end of the first stepped layer of the first secondary coil where the winding of the first secondary coil changed direction, changes direction and continues back to the second end of the first primary coil, thereby forming a first stepped layer in the second secondary coil;
wherein the winding of the second secondary coil continues to form a second stepped layer by proceeding from the second end of the first primary coil to the end of the second stepped layer of the first secondary coil where the winding of the first secondary coil changed direction, changes direction and continues back to the second end of the first primary coil, thereby forming the second stepped layer in the first secondary coil;
wherein each stepped layer of the first secondary coil corresponds to a stepped layer of the second secondary coil;
wherein each subsequent stepped layer of the second secondary coil is wound by beginning at the second end of the first primary coil, winding toward the point at which the winding of the corresponding stepped layer of the first secondary coil changed direction, changing direction and continuing back to the second end of the first primary coil;
wherein the second secondary coil comprises a first stepped layer and a last stepped layer;
wherein the distance between steps in the second secondary coil is equal to the distance between steps in the first secondary coil;
wherein the length of each corresponding stepped layer in the first secondary coil and the second secondary coil is equal to the distance from the first end of the first primary coil to the second end of the first primary coil;
wherein the second primary coil is wound around the last layers of the first and second secondary coils;
wherein the first and second secondary coils each comprises a thick portion;
wherein there is an inductive coupling between the first primary coil and the first secondary coil, between the first primary coil and the second secondary coil, between the second primary coil and the second secondary coil, and between the second primary coil and the first secondary coil;
wherein the first primary coil is in physical proximity to the thick portion of the first secondary coil, and the second primary coil is in physical proximity to the thick portion of the second secondary coil;
wherein the inductive coupling between the first primary coil and the first secondary coil is larger than the inductive coupling between the first primary coil and the second secondary coil, and the inductive coupling between the second primary coil and the second secondary coil is larger than the inductive coupling between the second primary coil and the first secondary coil; and
wherein the inductive couplings between the primary and secondary coils cause null position to be physically centered within the transformer.

16. A linear variable differential transformer comprising:
(a) a coil form;
(b) a first primary coil;
(c) a second primary coil;
(d) a first secondary coil; and
(e) a second secondary coil;
wherein the first primary coil is comprised of a single piece of wire;
wherein the first primary coil is wound around the coil form in at least two layers;
wherein the winding of the first primary coil around the coil form begins at a first end of the coil form, proceeds to a second end of the coil form, and then changes direction and continues from the second end of the coil form back to the first end of the coil form, thereby forming the first two layers of the first primary coil;

wherein the first secondary coil is comprised of a single piece of wire;

wherein the first secondary coil is wrapped around the first primary coil in multiple stepped layers;

wherein each stepped layer of the first secondary coil comprises at least two layers of wire;

wherein the winding of the first secondary coil around the first primary coil begins at a first end of the first primary coil, proceeds to a certain distance short of a second end of the first primary coil, and then changes direction and continues back to the first end of the first primary coil, thereby forming a first stepped layer in the first secondary coil;

wherein the winding of the first secondary coil continues to form a second stepped layer by proceeding from the first end of the first primary coil to a certain distance short of the point at which the first stepped layer of the first secondary coil changed direction, changing direction and continuing back to the first end of the first primary coil, thereby forming the second stepped layer in the first secondary coil;

wherein each subsequent stepped layer of the first secondary coil is wound by beginning at the first end of the primary coil, winding toward the second end of the first primary coil, changing direction a certain distance short of the point at which the previous stepped layer changed direction, and continuing back to the first end of the first primary coil;

wherein the first secondary coil comprises a first stepped layer and a last stepped layer;

wherein the distance between the second end of the first primary coil and the first stepped layer of the first secondary coil is shorter than the distance between the second end of the first primary coil and any other stepped layer of the first secondary coil;

wherein the distance between the second end of the first primary coil and the last stepped layer of the first secondary coil is longer than the distance between the second end of the first primary coil and any other stepped layer of the first secondary coil;

wherein the distance between the second end of the first primary coil and the point at which the winding of the first stepped layer of the first secondary coil changes direction is equal to the distance between the point at which the winding of each subsequent stepped layer of the first secondary coil changes direction and the point at which the winding of the previous stepped layer of the first secondary coil changes direction, thereby creating uniform steps in the first secondary coil;

wherein the second secondary coil is comprised of a single piece of wire;

wherein the second secondary coil is wrapped around the first primary coil in multiple stepped layers;

wherein each stepped layer of the second secondary coil comprises at least two layers of wire;

wherein the winding of the second secondary coil around the first primary coil begins at the second end of the first primary coil, proceeds to the end of the first stepped layer of the first secondary coil where the winding of the first secondary coil changed direction, changes direction and continues back to the second end of the first primary coil, thereby forming a first stepped layer in the second secondary coil;

wherein the winding of the second secondary coil continues to form a second stepped layer by proceeding from the second end of the first primary coil to the end of the second stepped layer of the first secondary coil where the winding of the first secondary coil changed direction, changes direction and continues back to the second end of the first primary coil, thereby forming the second stepped layer in the first secondary coil;

wherein each stepped layer of the first secondary coil corresponds to a stepped layer of the second secondary coil;

wherein each subsequent stepped layer of the second secondary coil is wound by beginning at the second end of the first primary coil, winding toward the point at which the winding of the corresponding stepped layer of the first secondary coil changed direction, changing direction and continuing back to the second end of the first primary coil;

wherein the second secondary coil comprises a first stepped layer and a last stepped layer;

wherein the distance between the second end of the first primary coil and the point at which the winding of the first stepped layer of the second secondary coil changes direction is equal to the distance between the point at which the winding of each subsequent stepped layer of the second secondary coil changes direction and the point at which the winding of the previous stepped layer of the second secondary coil changes direction, thereby creating uniform steps in the second secondary coil;

wherein the distance between steps in the second secondary coil is equal to the distance between steps in the first secondary coil;

wherein the length of each corresponding stepped layer in the first secondary coil and the second secondary coil is equal to the distance from the first end of the first primary coil to the second end of the first primary coil;

wherein the second primary coil is wound around the last layers of the first and second secondary coils;

wherein the first and second secondary coils each comprises a thick portion;

wherein there is an inductive coupling between the first primary coil and the first secondary coil, between the first primary coil and the second secondary coil, between the second primary coil and the second secondary coil, and between the second primary coil and the first secondary coil;

wherein the first primary coil is in physical proximity to the thick portion of the first secondary coil, and the second primary coil is in physical proximity to the thick portion of the second secondary coil;

wherein the inductive coupling between the first primary coil and the first secondary coil is larger than the inductive coupling between the first primary coil and the second secondary coil, and the inductive coupling between the second primary coil and the second secondary coil is larger than the inductive coupling between the second primary coil and the first secondary coil; and wherein the inductive couplings between the primary and secondary coils cause null position to be physically centered within the transformer.

17. The linear variable differential transformer of claim 15 or 16, wherein the first and second primary coils are of a constant thickness.

18. The linear variable differential transformer of claim 15 or 16, further comprising a moveable core and a connecting rod,
- wherein the moveable core is situated inside of the coil form;
- wherein the connecting rod connects the moveable core to an external device that causes the connecting rod and moveable core to move laterally inside the coil form;
- wherein magnetic flux induces voltages in the first and second secondary coils; and
- wherein the magnitude of the voltage induced in each secondary coil is a function of input voltage to the primary coils and position of the moveable core relative to the secondary coil.

19. The linear variable differential transformer of claim 18, wherein the moveable core is comprised of a material having high magnetic permeability aid low magnetic hysteresis.

20. The linear variable differential transformer of claim 18, wherein the transformer has an overall length, wherein the transformer produces an output voltage, and wherein the output voltage is substantially linearly proportional to the displacement of the moveable core over a length equal to approximately at least seventy percent of the overall length of the device.

21. The linear variable differential transformer of claim 15 or 16, wherein the coil form is comprised of a material that has low magnetic hysteresis and low magnetic permeability.

22. The linear variable differential transformer of claim 15 or 16, wherein the primary and secondary coils are comprised of insulated wire having high electrical conductivity.

23. The linear variable differential transformer of claim 15 or 16, wherein each of the primary and secondary coils comprises a pitch, and wherein the pitch of each coil is both constant and narrow.

24. The linear variable differential transformer of claim 15 or 16, further comprising an electrical connection, wherein the electrical connection is installed between the first secondary coil and second secondary coil.

25. The linear variable differential transformer of claim 15 or 16, wherein each step comprises a length, and wherein voltage output to the secondary coils can be controlled by increasing or decreasing the step length.

26. The linear variable differential transformer of claim 15 or 16, wherein each step comprises a length, wherein the length of all of the steps in a single transformer is uniform, and wherein voltage output to the secondary coils can be controlled by increasing or decreasing the step length.

27. The linear variable differential transformer of claim 15 or 16, wherein the transformer is connected to a variable-area flowmeter;
- wherein the transformer-flowmeter assembly is encased in a housing that is designed to fit within well tubing having an inside diameter of approximately two inches;
- wherein the length of the coil form is approximately seven inches;
- wherein each step comprises a length, wherein the length of all of the steps in a single transformer except for the two steps at either end of the transformer is uniform, and wherein the step length is approximately one inch;
- wherein each secondary coil has six steps;
- wherein the moveable core is approximately slightly more than two inches long; and
- excitation voltage is provided to the primary coil as well as AC to DC output signal conversion.

28. The linear variable differential transformer of claim 15 or 16, wherein the transformer is connected to a variable-area flowmeter;
- wherein the transformer-flowmeter assembly is encased in a housing that is designed to fit within well tubing having an inside diameter of approximately two inches;
- wherein the length of the coil form is approximately seven inches;
- wherein each step comprises a length, wherein the length of all of the steps in a single transformer is uniform, and wherein the step length is approximately one inch;
- wherein each secondary coil has six steps;
- wherein the moveable core is approximately slightly more than two inches long; and
- wherein excitation voltage is provided to the primary coil as well as AC to DC output signal conversion.

29. The linear variable differential transformer of claim 15 or 16, wherein the first and second primary coils are comprised of the same wire.

30. The linear variable differential transformer of claim 15 or 16, wherein the first and second primary coils are comprised of two different wires that are connected to each other.

31. The linear variable differential transformer of claim 1, 2, 15 or 16, wherein the first and second secondary coils are comprised of the same wire.

32. The linear variable differential transformer of claim 1, 2, 15 or 16, wherein the first and second secondary coils are comprised of two different wires that are connected to one another.

* * * * *